United States Patent
You et al.

(10) Patent No.: US 10,483,831 B2
(45) Date of Patent: Nov. 19, 2019

(54) PERMANENT MAGNET APPLYING MOTOR

(71) Applicant: PHOENIX INVENIT, INC., Gyeongsangnam-do (KR)

(72) Inventors: Hack Churl You, Gyeongsangnam-do (KR); Ro Bin You, Gyeongsangnam-do (KR)

(73) Assignee: PHOENIX INVENT, INC. (KR)

( * ) Notice: Subject to any disclaimer, the term of this patent is extended or adjusted under 35 U.S.C. 154(b) by 0 days.

(21) Appl. No.: 15/762,111

(22) PCT Filed: Aug. 18, 2016

(86) PCT No.: PCT/KR2016/009060
§ 371 (c)(1),
(2) Date: Mar. 22, 2018

(87) PCT Pub. No.: WO2017/052075
PCT Pub. Date: Mar. 30, 2017

(65) Prior Publication Data
US 2018/0269758 A1 Sep. 20, 2018

(30) Foreign Application Priority Data
Sep. 25, 2015 (KR) .......................... 10-2015-0136995

(51) Int. Cl.
*H02K 16/00* (2006.01)
*H02N 11/00* (2006.01)
(Continued)

(52) U.S. Cl.
CPC ............... *H02K 16/00* (2013.01); *H02K 1/17* (2013.01); *H02K 1/2713* (2013.01); *H02K 7/116* (2013.01);
(Continued)

(58) Field of Classification Search
CPC ............ H02K 16/00; H02K 1/17; H02K 1/27; H02K 11/215; H02K 11/22; H02K 11/23;
(Continued)

(56) References Cited

U.S. PATENT DOCUMENTS

| | | | |
|---|---|---|---|
| 2010/0270885 A1* | 10/2010 | Izquierdo | H02K 53/00 310/152 |
| 2012/0153758 A1* | 6/2012 | Perry | H02K 53/00 310/152 |

(Continued)

FOREIGN PATENT DOCUMENTS

| | | |
|---|---|---|
| JP | 2000050616 | 2/2000 |
| JP | 2000050616 A * | 2/2000 |

(Continued)

OTHER PUBLICATIONS

Oi, Magnetic Force Motor, 2000, JP 2000050616 A, all pages (Year: 2000).*

(Continued)

*Primary Examiner* — Naishadh N Desai
(74) *Attorney, Agent, or Firm* — McDonald Hopkins LLC

(57) ABSTRACT

The present invention relates to a permanent magnet applying motor which uses a repulsive force and an attractive force, which act between different permanent magnets, and a repulsive force or an attractive force, which acts between a permanent magnet and an electromagnet. The permanent magnet applying motor includes a first rotating plate and a second rotating plate, a rotating shaft, a plurality of rotors, each rotor having a permanent magnet and a penetrating shaft. A plurality of planetary gears paired with the plurality of rotors and a center gear engaged with all of the plurality of planetary gears. The permanent magnet applying motor includes a rotating plate support including a first support and a second support, a stator support including a third support and a fourth support, one or more deadlock point detecting (Continued)

sensors on the rotating plate support; and an electromagnet portions on the stator support.

8 Claims, 12 Drawing Sheets

(51) Int. Cl.
*H02K 1/17* (2006.01)
*H02K 1/27* (2006.01)
*H02K 7/116* (2006.01)
*H02K 16/02* (2006.01)
*H02K 53/00* (2006.01)
*H02K 11/215* (2016.01)
*H02K 11/22* (2016.01)
*H02K 11/23* (2016.01)

(52) U.S. Cl.
CPC ............. *H02K 16/02* (2013.01); *H02N 11/00* (2013.01); *H02K 11/215* (2016.01); *H02K 11/22* (2016.01); *H02K 11/23* (2016.01); *H02K 53/00* (2013.01)

(58) Field of Classification Search
CPC ...... H02K 7/116; H02K 1/2713; H02K 99/00; H02K 53/00; H02N 11/00
See application file for complete search history.

(56) References Cited

U.S. PATENT DOCUMENTS

| 2013/0147298 A1* | 6/2013 | Giummo | H02K 53/00 310/152 |
| 2015/0145364 A1* | 5/2015 | Holcomb | H02K 53/00 310/113 |

FOREIGN PATENT DOCUMENTS

| JP | 2007336791 | 12/2007 |
| KR | 20080083083 | 9/2008 |
| KR | 20100049721 | 5/2010 |
| KR | 101040958 | 6/2011 |
| KR | 20110108602 | 10/2011 |
| KR | 101341450 | 12/2013 |
| KR | 101341450 B1 * | 12/2013 |

OTHER PUBLICATIONS

Patent Cooperation Treaty (PCT), International Search Report and Written Opinion for Application PCT/KR2016/009060 filed Aug. 18, 2016, dated Nov. 18, 2016, International Searching Authority, KR.

* cited by examiner

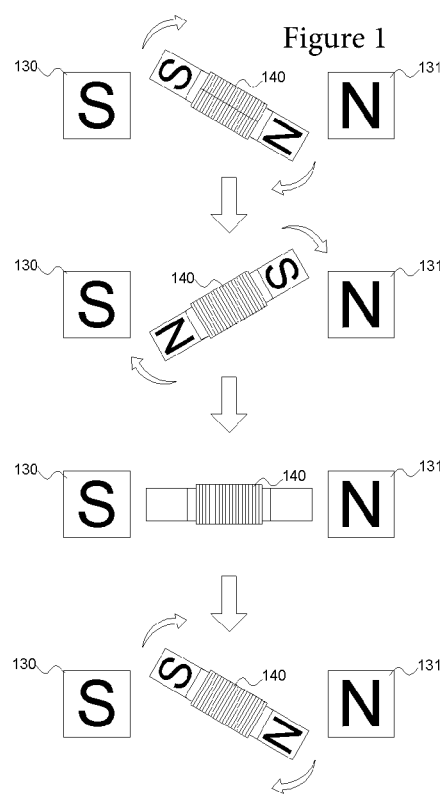

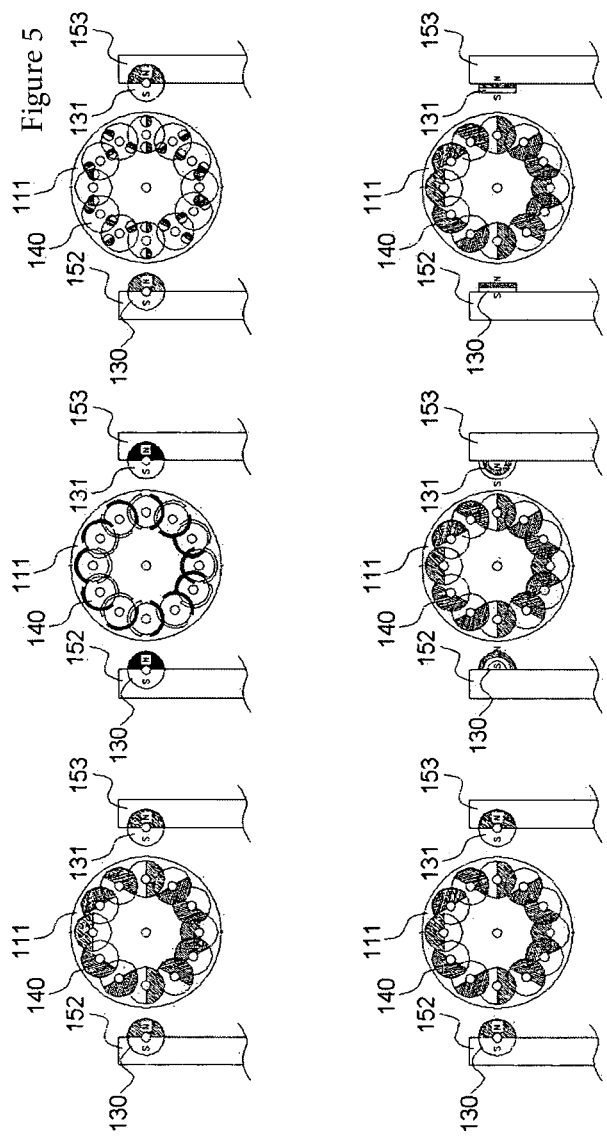

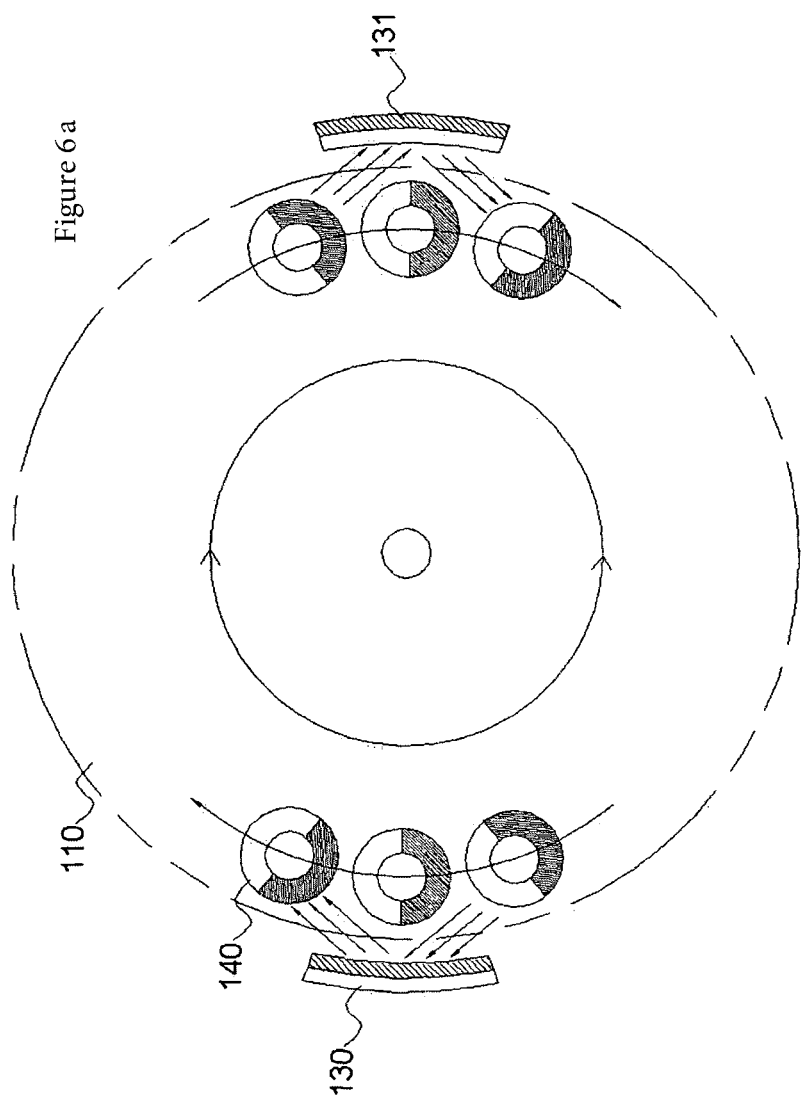

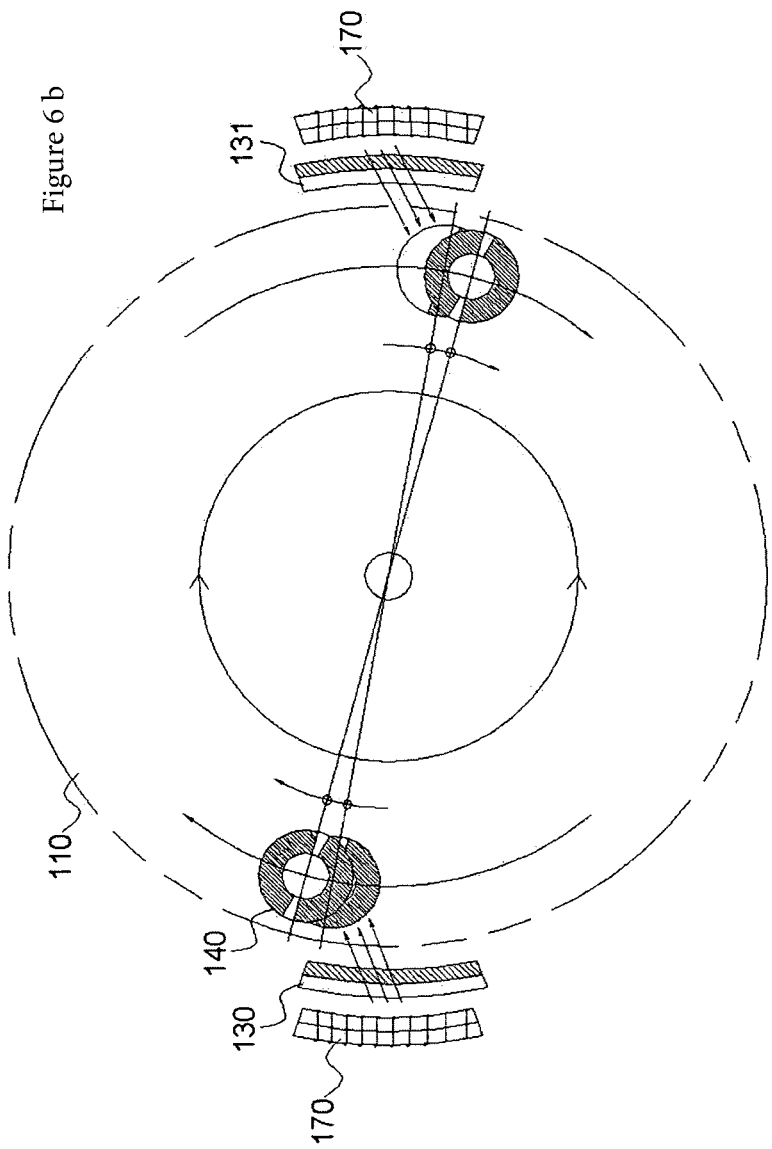

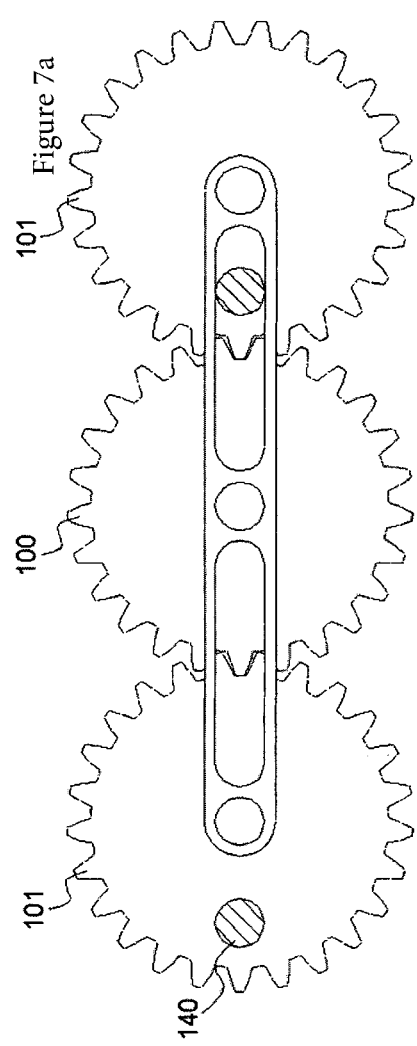

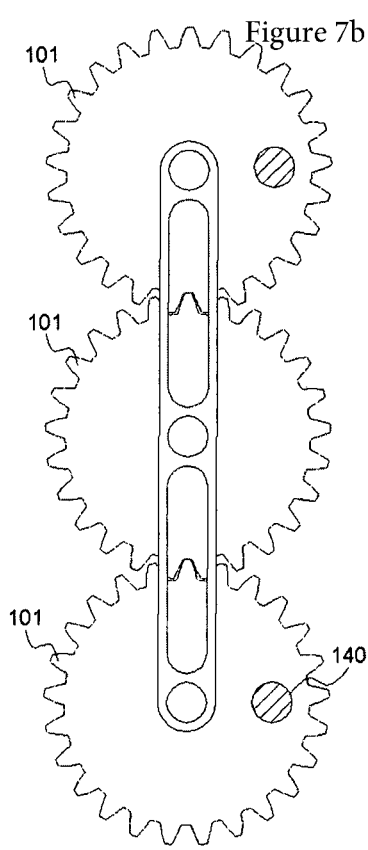

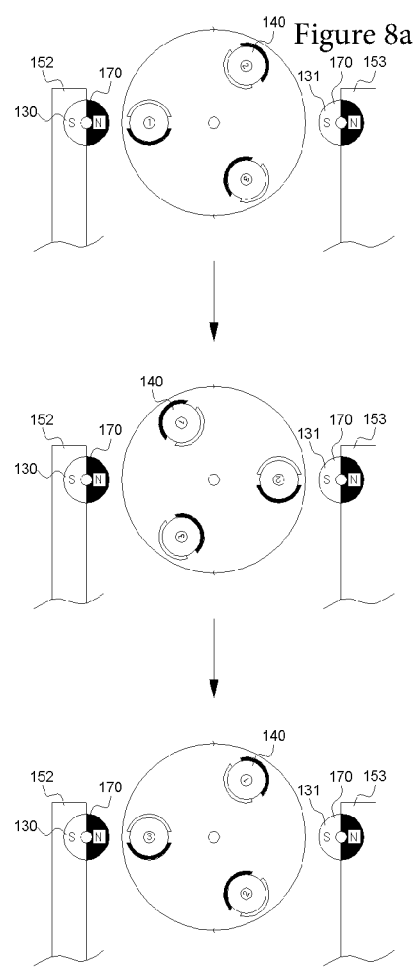

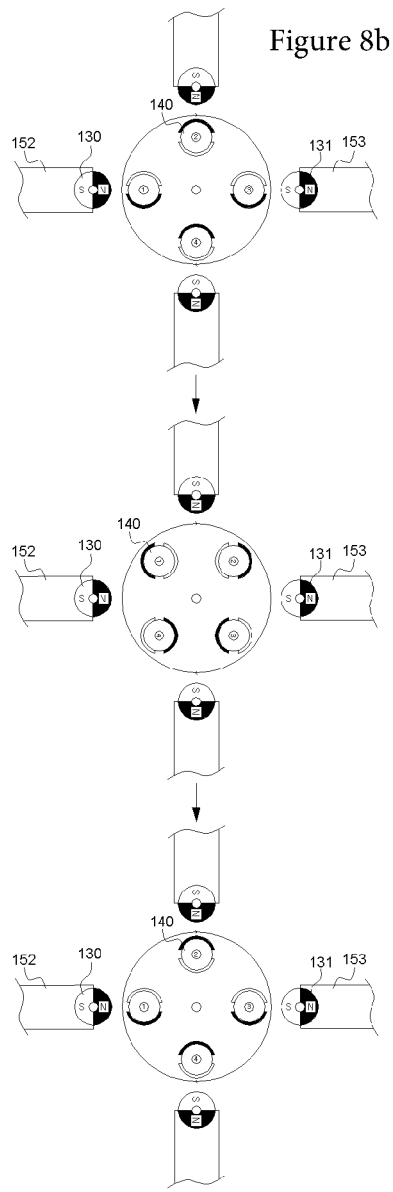

PERMANENT MAGNET APPLYING MOTOR

CROSS-REFERENCE TO RELATED APPLICATION

This application is a 35 U.S.C. 371 national stage filing of PCT Application No. PCT/KR2016/009060 filed on Aug. 18, 2016, which claims priority to Korean Patent Application No. 10-2015-0136995 filed on Sep. 25, 2015, each of which are incorporated herein in their entirety by reference.

TECHNICAL FIELD

The present disclosure relates to a permanent magnet applying motor using an attractive force and a repulsive force acting between different permanent magnets and a repulsive force and an attractive force acting between a permanent magnet and an electromagnet, and more particularly, to a permanent magnet applying motor in which a rotational force may be provided to a rotor due to a repulsive force and an attractive force acting between a stator and the rotor made of a permanent magnet, positions of an N pole and an S pole of the rotor may be physically switched to each other by a planetary gear connected to the rotor, a center gear engaged with the planetary gear, and a structure interlocking with the planetary gear, the repulsive force and the attractive force between the permanent magnets may be balanced so that a rotational state of the rotor is maintained at a deadlock point at which no rotational force is provided to the rotor, using the repulsive force or the attractive force between the permanent magnet and the electromagnet, and the rotational force is mostly acquired from a magnetic force of the permanent magnet so that power consumption may be reduced to the minimum.

BACKGROUND ART

In general, a motor is a device configured to convert electric energy into mechanical energy using a force which a current receives in a magnetic field.

Since the motor is extensively used as basic equipment for industrial production, but power consumption thereof is very high, a motor is required which may reduce the power consumption and achieve the maximum effect.

Korean Patent No. 1995-0007865 entitled "Magnetic rotating device," Korean Patent Application Publication No. 10-2010-0049721 "Electromagnet motor," Korean Patent Application Publication No. 10-2011-0108602 entitled "Permanent magnet motor using circular permanent magnet and magnetic field shielding plate," and Korean Patent Application Publication No. 10-2013-014210 entitled "Permanent magnet for motor having reduced cogging torque and motor adopting same" have been proposed and disclosed as inventions related to a motor which reduces power consumption and/or increases efficiency to solve the above-described problem.

A device which may efficiently obtain rotational energy from a permanent magnet and may minimize a current supplied to an electromagnet is proposed in Korean Patent No. 1995-0007865 entitled "Magnetic rotating device," and a device which may increase efficiency of an electromagnet motor by minimizing loss of a magnetic flux between an electromagnet portion and a magnetic body when electric power is applied to the electromagnetic portion is provided in Korean Patent Application Publication No. 10-2010-0049721 entitled "Electromagnet motor."

Also, a device which obtains power using a repulsive force or an attractive force between a magnetic force of a stationary circular permanent magnet and a magnetic force of a rotating permanent magnet exposed through a hole of a magnetic field shielding plate having the hole formed therein is proposed in Korean Patent Application Publication No. 10-2011-0108602 entitled "Permanent magnet motor using circular permanent magnet and magnetic field shielding plate," and a device which may greatly reduce a cogging torque generated when a motor is driven even without reducing an output torque of the motor is proposed in Korean Patent Application Publication No. 10-2013-014210 entitled "Permanent magnet for motor having reduced cogging torque and motor adopting same."

However, in the related arts, although efficiency of the motor may be improved, a problem occurs in that power consumption is still maintained since it is required to consistently supply a current, a magnetic force between different poles is canceled since magnetic flux lines between magnets overlap with each other, and it is difficult to consistently drive the motor or efficiency is degraded due to reaction of a magnetic flux line and a frictional force by a deadlock point.

The deadlock point refers to a location where when a rotor rotating simultaneously while revolving arrives at a perihelion of a stator, since a boundary between an N pole and an S pole of the rotor faces the stator, an attractive force or a repulsive force between the rotor and the stator does not occur.

In more detail, the deadlock point refers to a deadlock state in which since magnetic flux lines of the N pole and the S pole of the rotor act with magnetic flux lines of the stator in three dimensions, an attractive force and a repulsive force between the rotor and the stator do not act.

This problem generally occurs even in a general motor using a permanent magnet, and since there is no clear solution, a user should accept that efficiency of the motor deteriorates.

Thus, a permanent magnet applying motor is required in which power consumption may be minimized, an amount of generated power may be maximized, and the deadlock point which is a disadvantage of the motor including only a permanent magnet may be overcome.

DISCLOSURE

Technical Problem

A permanent magnet applying motor according to the present disclosure corresponds to a technology for solving the above-described problems of the related art. In a general motor, a large amount of electric power is consumed since a current should be consistently supplied to a coil surrounding a rotor, a motor is required which has excellent efficiency even while power consumption is required, and it is impossible to consistently rotate a rotor since a motor including a stator and the rotor configured using only permanent magnets does not include a unit configured to overcome a deadlock point at which a repulsive force and an attractive force between the permanent magnets are balanced. Accordingly, an objective of the present disclosure is to provide a solution to the problems.

Technical Solution

To achieve the above-described objective, provided is a permanent magnet applying motor using a planetary gear and an electromagnet according to the present disclosure, in which the motor includes a first rotating plate and a second rotating plate, each of which has a through-hole formed at a central portion thereof to pass through one end and the other end thereof and has a plurality of insertion grooves formed at the one end thereof, a rotary shaft passing through a central portion of the first rotating plate and a central portion of the second rotating plate, a plurality of rotors arranged between the first rotating plate and the second rotating plate at regular intervals with respect to the rotary shaft and each including a permanent magnet and a penetration shaft passing through the permanent magnet, a plurality of planetary gears connected in pairs to the plurality of rotors, respectively, a center gear connected to one end of the rotary shaft and engaged with all the plurality of planetary gears, a rotating plate support including a first support and a second support connected to opposite ends of the rotary shaft, respectively, a stator support including a third support having a first stator formed therein and including a permanent magnet as a component and a fourth support having a second stator which is the same as the first stator, the third support and the fourth support being spaced apart from each other with respect to the rotary shaft, one or more deadlock point detecting sensors provided on one side of the rotating plate support, and one or more electromagnet portions provided on one side of the stator support.

Advantageous Effects

In a permanent magnet applying motor according to the present disclosure, when a rotor arrives at a deadlock point, if a position of the rotor is detected by a detection sensor or a contact-type rotating plate, a repulsive force of immediately pushing the rotor or an attractive force of immediately pulling the rotor according to a position of an electromagnet portion is generated by temporarily supplying a current to the electromagnet portion, so that the rotor may overcome the deadlock point and may consistently rotate. Unlike a general motor in which supply of a current is interrupted temporarily only and consistent supply of the current is required, the current is temporarily supplied to an electromagnet only when the rotor arrives at the deadlock point, so that power consumption may be minimized. A rotational force is mostly acquired using a strong magnetic force between permanent magnets including rare earth elements, so that a strong magnetic force may be obtained even without large power consumption. Therefore, the efficient motor may be implemented.

DESCRIPTION OF DRAWINGS

FIG. 1 is an exemplary view illustrating an operation principle of a conventional motor;

FIG. 5 is an exemplary view illustrating various shapes of a stator and a rotor constituting the permanent magnet applying motor according to the present disclosure;

FIGS. 6A and 6B are exemplary views illustrating an operation principle of the permanent magnet applying motor according to the present disclosure;

FIGS. 7A and 7B are exemplary views illustrating a physical pole switching state of the rotor and a planetary gear of the permanent magnet applying motor according to the present disclosure; and FIGS. 8A and 8B are exemplary views illustrating various embodiments of the permanent magnet applying motor according to the present disclosure.

MODES OF THE INVENTION

Figure 2A:
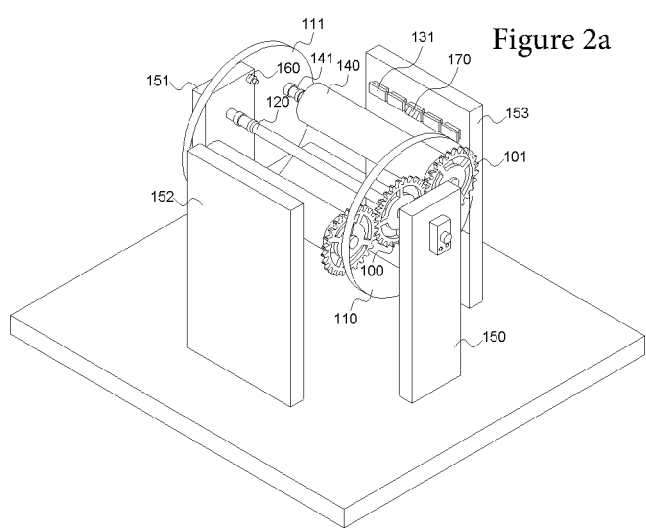
FIG. 2A is an external perspective view illustrating a permanent magnet applying motor according to the present disclosure.

The present disclosure relates to a permanent magnet applying motor using a repulsive force and an attractive force acting between different permanent magnets and a repulsive force and an attractive force acting between a permanent magnet and an electromagnet, and more particularly, to a permanent magnet applying motor including: a first rotating plate 110 and a second rotating plate 111, each of which has a through-hole formed at a central portion thereof to pass through one end and the other end thereof and has a plurality of insertion grooves formed at the one end thereof; a rotary shaft 120 passing through a central portion of the first rotating plate 110 and a central portion of the second rotating plate 111; a plurality of rotors 140 arranged between the first rotating plate 110 and the second rotating plate 111 at regular intervals with respect to the rotary shaft 120 and each including a permanent magnet and a penetration shaft 141 passing through the permanent magnet; a plurality of planetary gears 101 connected in pairs to the plurality of rotors 140, respectively; a center gear 100 connected to one end of the rotary shaft 120 and engaged with all the plurality of planetary gears 101; a rotating plate support including a first support 150 and a second support 151 connected to opposite ends of the rotary shaft 120, respectively; a stator support including a third support 152 having a first stator 130 formed therein and including a permanent magnet as a component and a fourth support 153 having a second stator 131 which is the same as the first stator 130, the third support 152 and the fourth support 153 being spaced apart from each other with respect to the rotary shaft 120; one or more deadlock point detecting sensors 160 provided on one side of the rotating plate support; and one or more electromagnet portions 170 provided on one side of the stator support.

Hereinafter, embodiments of the present disclosure will be described in detail with reference to the accompanying drawings.

First, the permanent magnet applying motor according to the present disclosure includes, as one component, the first rotating plate 110 and the second rotating plate 111, each of which has the through-hole formed at the central portion thereof to pass through the one end and the other end thereof and has the plurality of insertion grooves formed at the one end thereof.

The first rotating plate 110 and the second rotating plate 111 correspond to components required for revolving the rotors 140 such that the permanent magnet applying motor according to the present disclosure converts the repulsive force and the attractive force between the permanent magnets into a rotational force and required for physically switching positions of N poles and S poles of the rotors revolving simultaneously while rotating to each other, the through-hole corresponds to a component supporting the rotary shaft 120, which will be described below, and the insertion grooves correspond to components supporting the rotors 140, which will be described below.

That is, the first rotating plate 110 and the second rotating plate 111 serve as a "link arm" of a general planetary gear device.

Also, the permanent magnet applying motor according to the present disclosure includes, as one component, the rotary shaft 120 passing through a central portion of the first rotating plate 110 and a central portion of the second rotating plate 111.

The rotary shaft 120, which is a component required for allowing the permanent magnet applying motor according to the present disclosure to perform a rotational movement for converting the attractive force and the repulsive force between the permanent magnets into the rotational force, passes through the first rotating plate 110 and the second rotating plate 111 in a manner in which the rotary shaft 120 is inserted into the through-hole.

At this time, since components of the permanent magnet applying motor according to the present disclosure should be located between the first rotating plate 110 and the second rotating plate 111, the first rotating plate 110 and the second rotating plate 111 should be spaced apart from each other with respect to the rotary shaft 120.

Also, the permanent magnet applying motor according to the present disclosure includes, as one component, the plurality of rotors 140 arranged between the first rotating plate 110 and the second rotating plate 111 at regular intervals with respect to the rotary shaft 120 and each including the permanent magnet and the penetration shaft 141 passing through the permanent magnet.

The permanent magnet has a cylindrical shape having a hollow formed therein to pass through one end and the other end thereof and is divided into opposite sides having the same volume with respect to the hollow such that one side thereof has the property of an N pole and the other side thereof has the property of an S pole.

In general, in the motor, the permanent magnet is used in the rotor, and such a rotor may be classified into two types including a surface magnet type rotor and an interior magnet type rotor according to shapes and methods in which a permanent magnet is arranged.

Any one of the surface magnet type rotor and the interior magnet type rotor may be used as the rotor of the permanent magnet applying motor according to the present disclosure.

When the plurality of rotors 140 is arranged between the first rotating plate 110 and the second rotating plate 111 at regular intervals with respect to the rotary shaft 120, the plurality of rotors 140 has a circular shape and surrounds the rotary shaft 120 while revolving.

The plurality of rotors 140 is arranged between the first rotating plate 110 and the second rotating plate 111 as opposite ends of the penetration shaft 141 passing through the permanent magnet constituting the rotor 140 are inserted into the insertion grooves formed in the first rotating plate 110 and the second rotating plate 111, respectively. Only when having a length that is larger than that of the permanent magnet, the penetration shaft 141 may pass through the permanent magnet and the opposite ends of the penetration shaft 141 may be inserted into the insertion grooves, respectively.

Insertion holes may be formed in the first rotating plate 110 and the second rotating plate 111 instead of the insertion grooves. At this time, the penetration shaft 141 may pass through the insertion holes or may be fitted in the insertion holes.

The number of the rotors 140 may be one to ten.

After the permanent magnet applying motor according to the present disclosure is configured by one rotor 140, when the rotor 140 revolves, vibrations severely occur in the first rotating plate 110 and the second rotating plate 111 due to unbalance of the center of gravity.

In order to solve the above-described problem, a separate attachment having the same weight as that of the rotor 140 should be provided to adjust the center of gravity. However, it is preferable that since this manner is not efficient, two or more rotors 140 are provided.

In contrast, when the permanent magnet applying motor according to the present disclosure is configured by ten or more rotors 140, a structure of the permanent magnet applying motor becomes complex, and since the rotational force is reduced due to increases in frictional forces between a plurality of planetary gears 101, the number of which is the same as that of the rotors 140, and which will be described below, and the center gear 100, which will be described below, efficiency of the motor may deteriorate.

Thus, it is most preferable that the number of the rotors 140 constituting the permanent magnet applying motor according to the present disclosure is one to ten, preferably, two to nine.

Also, the permanent magnet applying motor according to the present disclosure includes, as one component, the plurality of planetary gears 101 connected to in pairs to the plurality of rotors 140, respectively.

Since the two to nine rotors 140 are provided, the number of the planetary gears 101 may be two to nine which is the same number as that of the rotors 140. Ideally, it is preferable that both the number of the rotors 140 and the number of the planetary gears 101 may be two to six.

The plurality of planetary gears 101 may be connected to the plurality of rotors 140, respectively, as the penetration shafts 141 constituting the rotors 140 pass through central portions of the planetary gears 101.

Also, the permanent magnet applying motor according to the present disclosure includes, as one component, the center gear 100 connected to the one end of the rotary shaft 120 and engaged with all the plurality of planetary gears 101.

The plurality of planetary gears 101 is arranged to surround the center gear 100 about the center gear 100.

Since the plurality of planetary gears 101 is engaged with the center gear 100, when the rotors 140 revolve and rotate about the center gear 100 due to repulsive forces and attractive forces between the first stator 130 and the second stator 131, and a plurality of teeth formed in the plurality of planetary gears 101 connected to the plurality of rotors 140 rotate while being engaged with a plurality of teeth formed in the center gear 100.

Although the plurality of planetary gears 101 revolves about the center gear 100 simultaneously while rotating, the center gear 100 is fixed without moving.

At this time, when the planetary gears 101 and the center gear 100 are formed to have the same size, the same gear ratio therebetween is provided, and a rotation ratio between the revolution and the rotation of the planetary gears 101 about the center gear 100 is 1:2.

That is, when the planetary gears 101 and the center gear 100 are formed to have the same size, a gear ratio between the planetary gears 101 and the center gear 100 is 1:1, and a rotation ratio between the revolution and the rotation of the planetary gears 101 about the center gear 100 is 1:2, so that the planetary gears 101 rotate by two rotations while the planetary gears 101 revolve by one revolution.

Also, when the planetary gears 101 are formed to have a smaller gear ratio than that of the center gear 100, a stator and an electromagnet portion may be additionally provided at positions that are different from those of the stator 130 and the electromagnet portion 170.

That is, when a gear ratio between the planetary gears 101 and the center gear 100 is 2:1, a rotation ratio between the revolution and the rotation of the planetary gears 101 about the center gear 100 is 1:4. Thus, it is preferable that since the planetary gears 101 rotate by four rotations while the planetary gears 101 revolve by one revolution, a stator and an electromagnet portion are additionally provided to increase a rotational force and a rotational speed of the rotors 140.

Also, the permanent magnet applying motor according to the present disclosure includes, one component, the rotating plate support including the first support 150 and the second support 151 connected to the opposite ends of the rotary shaft 120, respectively.

The first support 150 and the second support 151 are components required for maintaining the height of the rotary shaft 120 passing through central portions of the first rotating plate 110 and the second rotating plate 111 constant from a floor such that the first rotating plate 110 and the second rotating plate 111 may smoothly rotate without contact with the floor.

Also, the permanent magnet applying motor according to the present disclosure includes, one component, the stator support including the third support 152 having the first stator 130 having a permanent magnet as a component and the fourth support 153 having the second stator 131 which is the same as the first stator 130 such that the third support 152 and the fourth support 153 are spaced apart from each other with respect to the rotary shaft 120.

In the first stator 130 provided in the third support 152, an N pole or an S pole thereof is arranged toward the second stator 131 provided in the fourth support 153, and in the second stator 131, an N pole or an S pole thereof is arranged toward the first stator 130 to be opposite to an N pole or an S pole of the first stator 130.

Although the first stator 130 and the second stator 131 may have the same shape as that of the rotors 140, the first stator 130 and the second stator 131 may be provided in other forms.

Also, the permanent magnet applying motor according to the present disclosure includes, one component, the one or more deadlock point detecting sensors 160 provided on the one side of the rotating plate support.

The deadlock point detecting sensors 160 are optical sensors or magnetic sensors.

Also, a contact-type switch performing a cam motion may be provided instead of the deadlock point detecting sensors 160.

That is, in the permanent magnet applying motor according to the present disclosure, in a method of detecting a deadlock point, after a copper plate is provided in the rotating plate instead of the optical sensors, the contact-type switch operated by contact with the rotors by applying the cam motion may be used. In this case, this configuration may be applied to a constant speed motor in which it is unnecessary to adjust a speed.

Also, the permanent magnet applying motor according to the present disclosure includes, one component, the one or more electromagnet portions 170 provided on the one side of the rotating plate support.

The electromagnet portions are separately provided electromagnets or electromagnets which are located at middle ends of the first stator 130 and the second stator 131 and formed by directly winding coils on the permanent magnets constituting the first stator 130 and the second stator 131.

That is, any form of a generally-used electromagnet and the form in which the coil is wound on the permanent magnet may be used as the electromagnet portions 170.

When the rotors 140 are moved within a measurement range of the deadlock point detecting sensors 160, electric power is supplied to the electromagnet portions 170 by reaction of the deadlock point detecting sensors 160, and when the rotors 140 escape from the measurement range of the deadlock point detecting sensors 160, the supply of the electric power is interrupted.

Hereinafter, the permanent magnet applying motor according to the present disclosure will be described in more detail with reference to the accompanying drawings.

FIG. 1 is an exemplary view illustrating an operation principle of a general motor.

As illustrated in FIG. 1, in a general motor, the first stator 130 and the second stator 131, which are permanent magnets, are provided on opposite sides with respect to the rotors 140, and the rotor 140 obtains the rotational force through an attractive force between the S pole of the first stator 130 and the N pole of the rotor 140, an attractive force between the N pole of the second stator 131 and the S pole of the rotor 140, a repulsive force between the N pole of the second stator 131 and the N pole of the rotor 140, and a repulsive force between the S pole of the first stator 130 and the S pole of the rotor 140.

At this time, since only an attractive force is applied at a point at which the attractive force between the S pole of the first stator 130 and the N pole of the rotor 140 and the attractive force between the N pole of the second stator 131 and the S pole of the rotor 140 are maximized, the rotor 140 cannot obtain the rotational force. Thus, when the property of the rotor 140 as a magnet is removed by immediately and temporarily interrupting a current supplied to the coil, the attractive forces between the first stator 130 and the second stator 131 and the rotor 140 are removed, and the rotor 140 continuously rotates by an inertial force.

Thereafter, when the current is supplied to the coil again, the polarities are changed by a commutator, and thus the rotational force is generated by the repulsive force and the attractive force between the rotor 140 and the first stator 130 and the second stator 131.

Figure 2B:
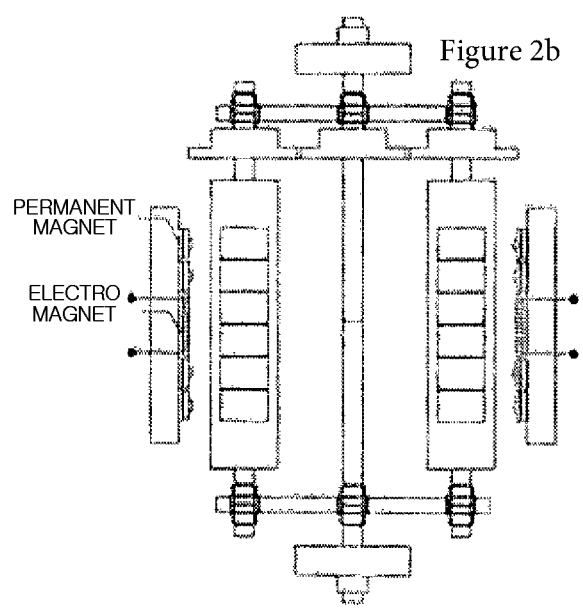
FIG. 2B is a plan view illustrating the permanent magnet applying motor according to the present disclosure.

FIG. 2A is an external perspective view illustrating a permanent magnet applying motor according to the present disclosure, and FIG. 2B is a plan view illustrating the permanent magnet applying motor according to the present disclosure.

As illustrated in FIGS. 2A and 2B, the permanent magnet applying motor according to the present disclosure includes the first rotating plate 110 and the second rotating plate 111, each of which has the through-hole formed at a central portion thereof to pass through the one end and the other end thereof and has the plurality of insertion grooves formed at the one end thereof, the rotary shaft 120 passing through the central portion of the first rotating plate 110 and the central portion of the second rotating plate 111, the plurality of rotors 140 arranged between the first rotating plate 110 and the second rotating plate 111 at regular intervals with respect to the rotary shaft 120 and each including the permanent magnet and the penetration shaft 141 passing through the permanent magnet, the plurality of planetary gears 101 connected in pairs to the plurality of rotors 140, respectively, and the center gear 100 connected to the one end of the rotary shaft 120 and engaged with all the plurality of planetary gears 101.

Also, the permanent magnet applying motor according to the present disclosure includes the rotating plate support including the first support 150 and the second support 151 connected to the opposite ends of the rotary shaft 120, respectively, the stator support including the third support 152 having the first stator 130 formed therein and including the permanent magnet as a component and the fourth support 153 having the second stator 131 which is the same as the first stator 130, the third support 152 and the fourth support 153 being spaced apart from each other with respect to the rotary shaft 120, the one or more deadlock point detecting sensors 160 provided on the one side of the rotating plate support, and the one or more electromagnet portions 170 provided on the one side of the stator support.

Figure 3:
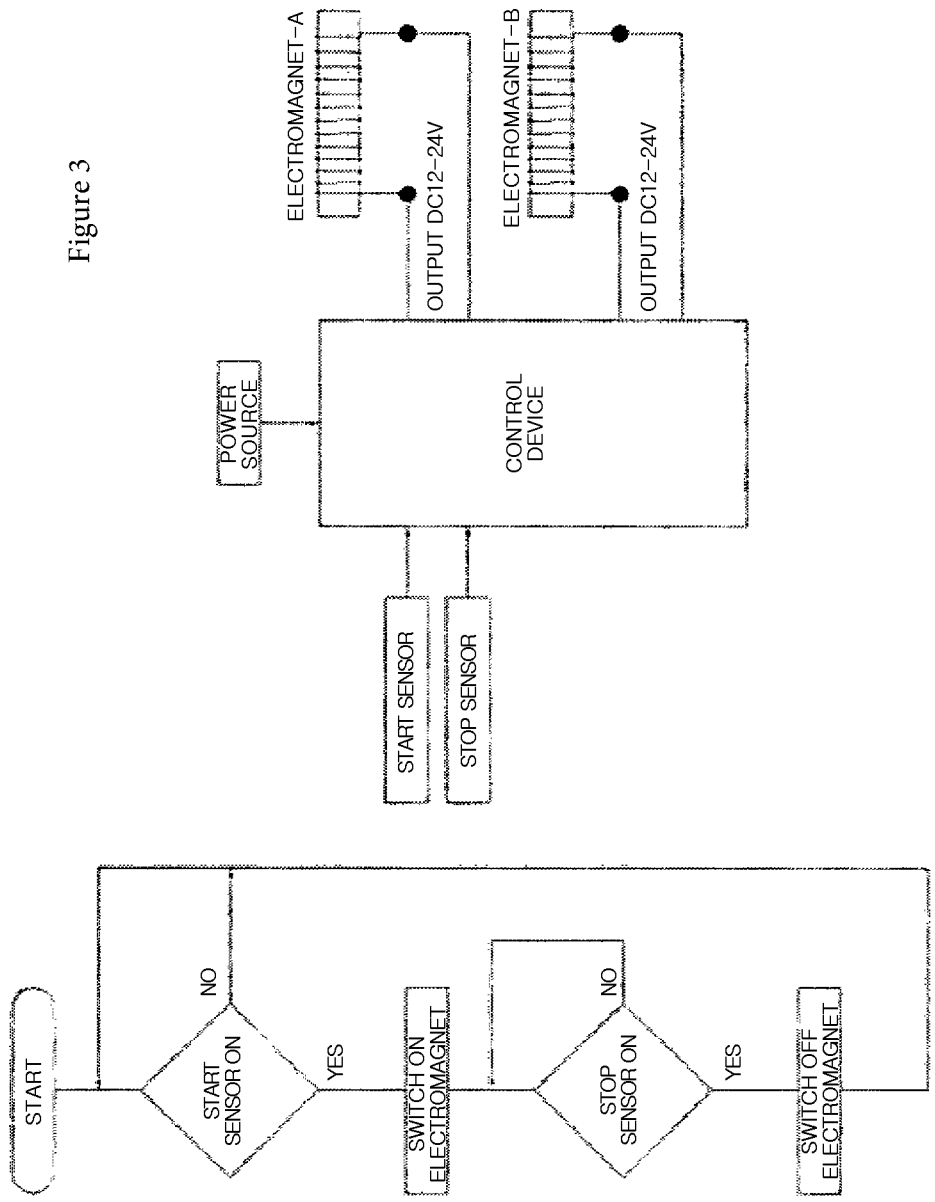
FIG. 3 is a circuit diagram illustrating the permanent magnet applying motor according to the present disclosure.

FIG. 3 is a circuit diagram illustrating the permanent magnet applying motor according to the present disclosure.

Only a constant speed operation may be performed to mechanically and immediately drive an electromagnet. In an electronic permanent magnet applying motor using an optical sensor, timing for an operation of an electromagnet is adjusted using an electronic circuit, and as a result, a rotational speed may be adjusted.

Also, when the permanent magnet applying motor starts to be operated, the start of the operation may be implemented through a start-dedicated electromagnet or an optical sensor control electronic circuit serving to start an operation of a rotor by sequentially supplying a current to an electromagnet.

Figure 4:
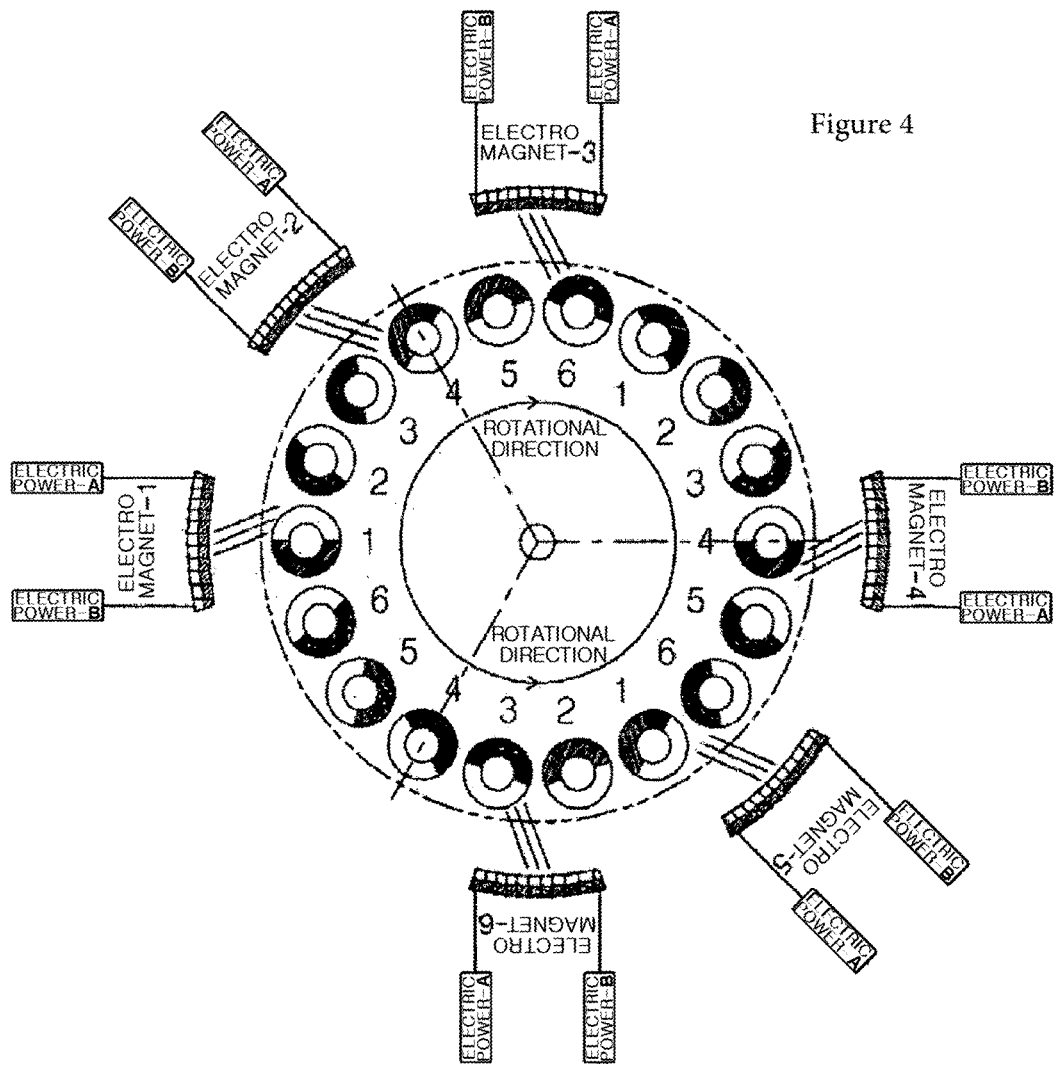
FIG. 4 is an exemplary view illustrating a state in which the permanent magnet applying motor according to the present disclosure starts to be operated.

FIG. 4 is an exemplary view illustrating a state in which the permanent magnet applying motor according to the present disclosure starts to be operated.

When two rotors 140 are configured and two electromagnet portions 170 are configured, since it is not easy to start the operation of the permanent magnet applying motor, a separate starting coil is required.

When three or more rotors 140 are configured, three or more electromagnet portions 170 are arranged. Thus, when the operation of the permanent magnet applying motor starts, if a current sequentially flows along a rotational direction of the electromagnet portions 170, the rotors 140 on which permanent magnets are mounted start to be rotated by the repulsive force and the attractive force.

When two rotors 140 are configured, a starting electromagnet is separately required according to an angle of arrangement.

FIG. 5 is an exemplary view illustrating various shapes of a stator and a rotor constituting the permanent magnet applying motor according to the present disclosure.

As illustrated in FIG. 5, the first stator 130 and the second stator 131 and the rotors 140 constituting the permanent magnet applying motor according to the present disclosure may be configured in various forms including a cylindrical type, a flat type, a surface magnet type, an interior magnet type, and the like.

FIGS. 6A and 6B are exemplary views illustrating an operation principle of the permanent magnet applying motor according to the present disclosure.

As illustrated in FIG. 6A, unlike the general motor in which a rotor is configured by an electromagnet and a stator is configured by a permanent magnet, in the permanent magnet applying motor according to the present disclosure, all the rotors 140, the origin stator 130, and the midpoint stator 131 are configured by permanent magnets.

In the general motor, since the rotor only rotates in place, a deadlock point exists at which an N pole of the rotor and an S pole of the stator face each other and an S pole of the rotor and an N pole of the stator face each other.

In order to solve the above-described problem, in the permanent magnet applying motor according to the present disclosure, a force in a deadlock state is minimized using the planetary gears 101.

Also, as illustrated in FIG. 6B, the permanent magnet applying motor according to the present disclosure includes the deadlock point detecting sensors 160 configured to detect whether the rotors 140 arrive at the deadlock point, so that when the deadlock point detecting sensors 160 detect the rotors 140, a current is temporarily supplied to the electromagnet portions 170.

When the electromagnet portions 170 are electromagnets, the rotors 140 arriving at the deadlock point are rotated by a repulsive force between the rotors 140 and the electromagnetic portions 170 so that the deadlock point is overcome.

Although an attractive force may be used according to arrangement of the electromagnet portions 170, using the repulsive force applied in the same direction as the rotational direction of the rotors 140 is more advantageous for maintaining the rotational force.

FIGS. 7A and 7B are exemplary views illustrating a physical pole switching state of the rotor and a planetary gear of the permanent magnet applying motor according to the present disclosure.

As illustrated in FIG. 7A, the permanent magnet applying motor according to the present disclosure includes the plurality of planetary gears 101, the center gear 100 engaged with the plurality of planetary gears 101, and the first rotating plate 110 interlocking with the planetary gears 101.

When the planetary gears 101 and the center gear 100 are formed to have the same size so that the planetary gears 101 and the center gear 100 have the same gear ratio, a rotation ratio between the revolution and the rotation of the planetary gears 101 about the center gear 100 is 1:2, so that the planetary gears 101 rotate by two rotations while the planetary gears 101 revolve by one revolution.

Therefore, as the planetary gears 101 rotate simultaneously while revolving, the planetary gears 101 rotate by 180 degrees while revolving by 90 degrees from an initial position.

Thereafter, as the planetary gears 101 rotate simultaneously while revolving in turn, the planetary gears 101 rotate by 180 degrees in the same direction as that of the revolution while revolving by 90 degrees, so that the planetary gears 101 revolve by 180 degrees and rotate by 360 degrees as compared with an initial position, as illustrated in FIG. 7B.

Thereafter, as the planetary gears 101 rotate simultaneously while revolving in turn, the planetary gears 101 rotate by 180 degrees in the same direction as that of the revolution while revolving by 90 degrees, so that the planetary gears 101 revolve by 270 degrees and rotate by 540 degrees as compared with the initial position.

Thereafter, as the planetary gears 101 rotate simultaneously while revolving in turn, the planetary gears 101 rotate by 180 degrees in the same direction as that of the revolution while revolving by 90 degrees, so that the planetary gears 101 revolve by 360 degrees and rotate by 720 degrees as compared with the initial position, and thus are situated at the initial position.

At this time, since the rotors 140 connected to the planetary gears 101 rotate in the same manner as the planetary gears 101, directions of the poles are maintained to be the same as those of the initial position.

In the above-described principle, in the conventional motor, the commutator configured to change the polarity of the current consistently supplied to the rotor may be physically implemented using the planetary gears 101 only by permanent magnets.

In the conventional motor configured to switch the polarity of the rotor using the commutator, a current should be supplied always. However, in the permanent magnet applying motor, since the polarities of the rotors are physically switched using the planetary gears, the occurrence of the deadlock point which is characteristics of a permanent magnet motor is immediately solved using an electromagnet, so that the same rotational force may be obtained only using 10% to 20% of the current required by the conventional motor.

FIGS. 8A and 8B are exemplary views illustrating various embodiments of the permanent magnet applying motor according to the present disclosure.

As illustrated in FIG. 8A, the permanent magnet applying motor according to the present disclosure may include three rotors 140 and three planetary gears 101.

When the permanent magnet applying motor including the three rotors 140 and the three planetary gears 101 according to the present disclosure is operated, if the rotors 140 alternately arrive at deadlock points corresponding to perihelia between the rotors 140 and the first stator 130 and the second stator 131, the current flows in the electromagnet portions 170 provided in the third support 152 and the fourth support 153.

At this time, the electromagnet portions 170 provided in the third support 152 and the fourth support 153 provide a repulsive force or an attractive force to the rotors 140 to rotate the rotors 140.

Since the electromagnet portions 170 of FIG. 8A are provided at the middle ends of the first stator 130 and the second stator 131, respectively, and are not viewed from a lateral side, the electromagnet portions 170 are not illustrated.

As illustrated in FIG. 8B, the permanent magnet applying motor according to the present disclosure may include four rotors 140 and four planetary gears 101.

When the permanent magnet applying motor including the four rotors 140 and the four planetary gears 101 according to the present disclosure is operated, if all the rotors 140 arrive at the deadlock points corresponding to the perihelia between the rotors 140 and the first stator 130 and the second stator 131, the current flows in the electromagnet portions 170 provided in the third support 152 and the fourth support 153, respectively.

At this time, the electromagnet portions 170 provided in the third support 152 and the fourth support 153 provide the repulsive force or the attractive force to the rotors 140 to rotate the rotors 140.

Since the electromagnet portions 170 of FIG. 8B are provided at the middle ends of the first stator 130 and the second stator 131, respectively, and are not viewed from a lateral side, the electromagnet portions 170 are not illustrated.

The permanent magnet applying motor according to the present disclosure has the strong rotational force and may greatly reduce power consumption through the above-described effect, so that the permanent magnet applying motor may be substituted for the conventional power motor. In particular, the permanent magnet applying motor is applied to the electric vehicle field, so that a travel distance may be greatly increased even while a battery having the same capacity as that of the conventional battery is used.

Also, when the permanent magnet applying motor is applied to a refrigerant compressor of an air conditioner, power consumption of which is large, electric power consumed for cooling may be greatly reduced.

The above-described embodiments are provided as examples such that those skilled in the art to which the present disclosure pertains may fully understand the technical spirit of the present disclosure, and the present disclosure is not limited to the above-described embodiments, and may be specified in other forms.

A part unrelated to the description is omitted to clearly describe the present disclosure, and in the drawings, the widths, the lengths, the thicknesses, and the like of components may be exaggeratedly or reducedly expressed for convenience.

Also, throughout the specification, the same reference numerals are designated by the same components.

INDUSTRIAL APPLICABILITY

The permanent magnet applying motor according to the present disclosure solves the problems of the conventional motor using only permanent magnets, thereby reducing power consumption, and achieving excellent efficiency. Therefore, industrial applicability is sufficient.

The invention claimed is:

1. A permanent magnet applying motor comprising:
a first rotating plate and a second rotating plate having through-holes formed at central portions of the first rotating plate and the second rotating plate, the first rotating plate and the second rotating plate having a plurality of insertion grooves formed at the ends of the first rotating plate and the second rotating plate;
a rotary shaft passing through a central portion of the first rotating plate and a central portion of the second rotating plate;
a plurality of rotors arranged between the first rotating plate and the second rotating plate at regular intervals with respect to the rotary shaft and each including a permanent magnet and a penetration shaft passing through the permanent magnet;
a plurality of planetary gears connected in pairs to the plurality of rotors, respectively;
a center gear connected to one end of the rotary shaft and engaged with all the plurality of planetary gears;
a rotating plate support including a first support and a second support connected to opposite ends of the rotary shaft, respectively;
a stator support including a third support which has a first stator formed in the third support and includes a permanent magnet as a component and a fourth support which has a second stator which is the same as the first stator, the third support and the fourth support being spaced apart from each other with respect to the rotary shaft;
one or more deadlock point detecting sensors provided on one side of the rotating plate support; and
one or more electromagnet portions provided on one side of the stator support.

2. The permanent magnet applying motor of claim 1, wherein the permanent magnet has a cylindrical shape having a hollow formed in the cylindrical shape to pass through one end and the other end of the cylindrical shape and is divided into opposite sides having the same volume with respect to the hollow, one side of the permanent magnet has a property of an N pole and the other side of the permanent magnet has a property of an S pole.

3. The permanent magnet applying motor of claim 1, wherein two to nine rotors are provided, and the number of the planetary gears is the same as that of the rotors.

4. The permanent magnet applying motor of claim 1, wherein when the planetary gears and the center gear are formed to have the same size, the planetary gears and the center gear have the same gear ratio, and a rotation ratio between revolution and rotation of the planetary gears about the center gear is 1:2.

5. The permanent magnet applying motor of claim 1, wherein when the planetary gears are formed to have a smaller gear ratio than that of the center gear, a stator and an electromagnet portion are additionally provided at positions that are different from those of the first stator, the second stator, and the electromagnet portions.

6. The permanent magnet applying motor of claim 1, wherein the deadlock point detecting sensors are optical sensors or magnetic sensors.

7. The permanent magnet applying motor of claim 1, wherein a contact-type switch performing a cam motion is provided instead of the deadlock point detecting sensors.

8. The permanent magnet applying motor of claim 1, wherein the electromagnet portions are located at middle ends of the first stator and the second stator, and are separately provided electromagnets or electromagnets formed by directly winding coils on the permanent magnets constituting the first stator and the second stator.

* * * * *